(12) United States Patent
Thörner et al.

(10) Patent No.: US 6,463,443 B1
(45) Date of Patent: Oct. 8, 2002

(54) METHOD AND DEVICE FOR DIRECTORY SERVICES FOR TELECOMMUNICATION

(75) Inventors: Jan Thörner, Upplands Väsby; Robert Brlenic, Älvsjö ; Henrik Lundgren, Uppsala, all of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/453,350

(22) Filed: Dec. 1, 1999

Related U.S. Application Data

(63) Continuation of application No. PCT/SE98/01040, filed on Jun. 2, 1998.

(30) Foreign Application Priority Data

Jun. 2, 1997 (SE) .............................................. 9702088

(51) Int. Cl.⁷ .............................................. G06F 17/00
(52) U.S. Cl. .............................. 707/104; 707/4; 707/9; 707/10; 705/26; 705/27; 713/168; 395/200.47
(58) Field of Search .............................. 707/4, 10, 104, 707/9; 395/200.47; 705/26, 27; 709/200; 713/168

(56) References Cited

U.S. PATENT DOCUMENTS

| | | | | |
|---|---|---|---|---|
| 4,782,509 A | | 11/1988 | Shepard .................... 379/88.17 |
| 5,155,847 A | | 10/1992 | Kirouac et al. ............. 709/221 |
| 5,204,894 A | | 4/1993 | Darden .................... 379/88.03 |
| 5,337,347 A | | 8/1994 | Halstead-Nussloch et al. ... 379/88.14 |
| 5,457,738 A | | 10/1995 | Sylvan .................... 379/93.23 |
| 5,483,586 A | | 1/1996 | Sussman ................ 379/218.01 |
| 5,809,299 A | * | 9/1998 | Cloutier et al. ............. 707/104 |
| 5,819,284 A | * | 10/1998 | Farber et al. ................ 707/104 |
| 5,835,087 A | * | 11/1998 | Herz et al. .................. 345/327 |
| 5,918,013 A | * | 6/1999 | Mighdoll et al. ....... 395/200.47 |
| 5,974,441 A | * | 10/1999 | Rogers et al. .............. 709/200 |
| 5,987,454 A | * | 11/1999 | Hobbs .......................... 707/4 |
| 6,023,683 A | * | 2/2000 | Johnson et al. ................ 705/26 |
| 6,029,175 A | * | 2/2000 | Chow et al. ................. 707/104 |
| 6,055,516 A | * | 4/2000 | Johnson et al. ................ 705/27 |
| 6,094,655 A | * | 7/2000 | Rogers et al. ................ 707/10 |
| 6,105,027 A | * | 8/2000 | Schneider et al. ............. 707/9 |
| 6,178,505 B1 | * | 1/2001 | Schneider et al. .......... 713/168 |

FOREIGN PATENT DOCUMENTS

| | | |
|---|---|---|
| EP | 0 457 077 | 11/1991 |
| WO | 97/16935 | 5/1997 |

* cited by examiner

*Primary Examiner*—Charles L. Rones
*Assistant Examiner*—Thuy Pardo
(74) *Attorney, Agent, or Firm*—Burns, Doane et al.

(57) ABSTRACT

For directory services for telecommunication, a data network, a terminal connected to the data network, at least one database in the data network, and a device for interactive communication between the terminal and the network regarding the database are provided. The database includes catalogue data regarding subject information about persons/families/companies, so that catalogue searches using different search criteria can be done. The desired information and adequate search criteria may be asked for from the terminal. The search is performed, and the desired catalogue data is presented visually on a display of the terminal asking for the subject information. The device also includes a reliable database outside the network, accessible and changeable only by admitted operating staff devices, and a transmitter for transmitting information from the reliable database to at least a reliable part of the database inside the network.

20 Claims, 2 Drawing Sheets

1

METHOD AND DEVICE FOR DIRECTORY SERVICES FOR TELECOMMUNICATION

This application is a continuation of International Application No. PCT/SE98/01040 filed on Jun. 2, 1998, which designates the United States.

This invention relates to a method for directory services for telecommunication of the kind mentioned in the preamble of claim 1 and a device to realise the method.

BACKGROUND

There is often an incomplete knowledge about a telephone number of a person or an organisation as regards his or hers complete address(es) and/or telephone numbers, facsimile numbers, E-Mail-address or the like. When presented with an unknown telephone number, for example from a Calling Line Presentation device, there is an interest to know to what person/organisation this number belongs. There could also be an incomplete information about a persons address(es) and/or telephone and/or facsimile numbers and a need to have a complete set of numbers in order to reach the person in question. There could also be a need to know some special feature, such as the home address, without knowing all the other details about a person. Currently there is no simple way to search and retrieve this kind of information in real time and on a visual interface. For instance it is often necessary to call different telephone numbers to different operators in order to find out a certain telephone number for a person/organisation or to find out the subscriber of a particular telephone number.

The solutions to provide information related to the above mentioned technical field are nowadays:

Calling an operator, or an automatic system, and via a voice communication get information about someone's telephone number(s) and postal address(es).

Calling an operator or an automatic system (through another telephone number), and via a voice communication get the owner of a certain telephone number.

Looking up a person or an organisation on an internet, i.e. a multiple network comprising several interconnected sub-networks, or in a telephone book and find his/her postal address and/or telephone/facsimile number or numbers.

The main problems with the prior known solutions are:

There are no visual solution (only voice) except for the internet solution for getting the information of the owner of a certain telephone number.

Telephone books are only updated once a year, and thus they normally contain many incorrect numbers and addresses.

Complete information of a customer's communication addresses is not given.

Incomplete information from the user can not be handled.

Cellular radiotelephone communication systems could be provided with a network directory database. WO 9716935 discloses a method to search in this directory database from its radiotelephone using search criteria and to store identified telephone numbers in a memory in the telephone. The radiotelephone is provided with a keypad and a display on which the user can view the stored telephone numbers and place a call by marking a suitable number and using a dedicated function key. The search in the database is provided only to find telephone numbers related to the actual telephone system and not the other way around or to make searches in other kinds of networks.

SUMMARY

An object of the invention is to provide a method and a device to be able to provide desired information about a person's communication possibilities and/or residence in an easy way without any installation adapted to a particular kind of telephone system.

Another object of the invention is to provide a method and a device to provide information about a person, an organisation, a telephone number, a residence or the like on-line.

Yet another object of the invention is to provide a method and a device to provide a total search from the knowledge of a person or some communication data related to him/her.

Still another object of the invention is to provide a method and a device for a public network to provide databases having information with a guaranteed degree of accuracy.

Another object of the invention is to provide a method and a device to provide databases, in a public network, which always have accurate and reliable information.

A method for directory services for telecommunication onto which the invention is based, comprises the following steps:

connecting terminal means (1) to a data network;

providing database means in the data network comprising catalogue data regarding subject information about persons/families/companies/organisations, and arranged so that catalogue searches using different search criteria can be performed, providing means for interactive communication between the terminal means and the network regarding the database means;

asking for the desired information and adequate search criteria from the terminal means, making the search, and presenting desired catalogue data visually on a display of the terminal means asking for the subject information.

The method and device according to the invention is characterized by providing a reliable database outside the network only accessible and changeable only by admitted operating staff means, transmitting information from the reliable database to at least a reliable inside portion of the database means inside the network which portion is to be kept reliable.

At least two independent reliable database portions of the outside database means are preferably provided inside the network, both being provided with the information in the reliable outside database and updated when the information in the reliable outside database is amended. In this way it is guaranteed that there is a redundancy in the data network even if there is a failure in the system and that a person asking for information will have a good chance to get a proper one.

Instead of having two independent reliable database portions as copies of the reliable outside database or as a complement to this feature a monitor means could be provided between each reliable portion of the inside database means and the outside reliable database to supervise that the reliable portion of the inside database means has the same information as the outside reliable database.

An additional inside database portion not being supervised adapted for customers could be provided to add data regarding their own subject information present in the reliable database to be supervised. This makes it possible for a person/company or the like to add extra information about himself, the company or the like, such as another address and telephone number valid only for a short time, or an attractive article on sale etc. At least one of the inside database portions could be provided with an intelligent network (IN) providing alternative information if available and/or demanded. The intelligent network could be connectable to the menu and a person searching for information about personal data regarding persons or companies etc. could mark if he wishes to have just as little information as possible, basic data, around what he searches or full information. The search could also be made in steps in which the first step is basic information and the second is full information or there could be some steps with increasing amount of wished information there between. The data network is preferably of a public kind, such as an internet, an intranet or the like, being readable by anyone connected to the public data network. The database means in the data network could be at least two, and then a search engine means could be inserted in the data network to make search for the desired information among the database means.

Question menu means could be provided in the search engine means and be provided to the terminal means when activating a search for subject information by answering a question of the kind of desired subject information and knowledge about data usable for database search for finding the desired subject information is derivable. This makes it able to make a search using whatever knowledge available about a person for which data is to be searched.

One database or some or the databases in a database means is preferably provided with supervising means supervising that at least a secure part of their contents is reliable. This feature is a very useful one in an intranet or an internet, since some people using the network are inclined to make amendments in information inserted in the network. It is necessary to be able to have confidence in a telephone book or the like inserted into the network. Otherwise, such a database will not be used. A monitor means could then be placed between the part of the database to be supervised and a database having the same information which is changeable only by admitted staff means. An additional part being not supervised for customers could be provided to add data regarding their subject information in the database to be supervised. The changes in such registers could be done only by using a particular code word special for the customer in question.

Information on the security qualities of the information derived from the searched databases could be fed to the terminal means asking for the subject information, so that a mixing of fully secure data and doubted data could be mixed in the same search. It is an advantage to be able to search in all available databases having data about persons even though the information in some databases is doubtful. Information about a person or company or the like could sometimes only be found in such a way. However, it will then be useful to know the degree of security of the database providing the information.

ADVANTAGES OF THE INVENTION

The advantages as compared with the prior known solutions are:

A complete information of persons and organisations communication addresses is given automatically if desired.

The information media is an image on a display instead of voice.

Incomplete input information from a user may be used.

Possibility to divide data for a customer in two parts, one in which the customer himself can make changes (without introducing errors in the network if it happens to be wrong), and one which the customer never will be allowed to change.

A service in accordance with the invention can be opened quite fast since Internet access is commonly spread and directory service databases for telephone numbers and addresses already exist.

BRIEF DESCRIPTION OF THE DRAWINGS

For a more complete understanding of the present invention and for further objects and advantages thereof, reference is now made to the following description taken in conjunction with the accompanying drawing, in which.

DETAILED DESCRIPTION

PCs (PC=Personal Computers) will in the future automatically be provided with a multimedia interface, such an access to a data network, e.g. a public data network, for instance an internet, i.e. comprising multiple sub-networks communicating with each other, or an internal data network, e.g. an intranet within a company or the like, or more generally an IP-access (IP=Internet Protocol), toward the users, i.e. voice, text, and images possibilities will alternatively be present.

Figure 1:
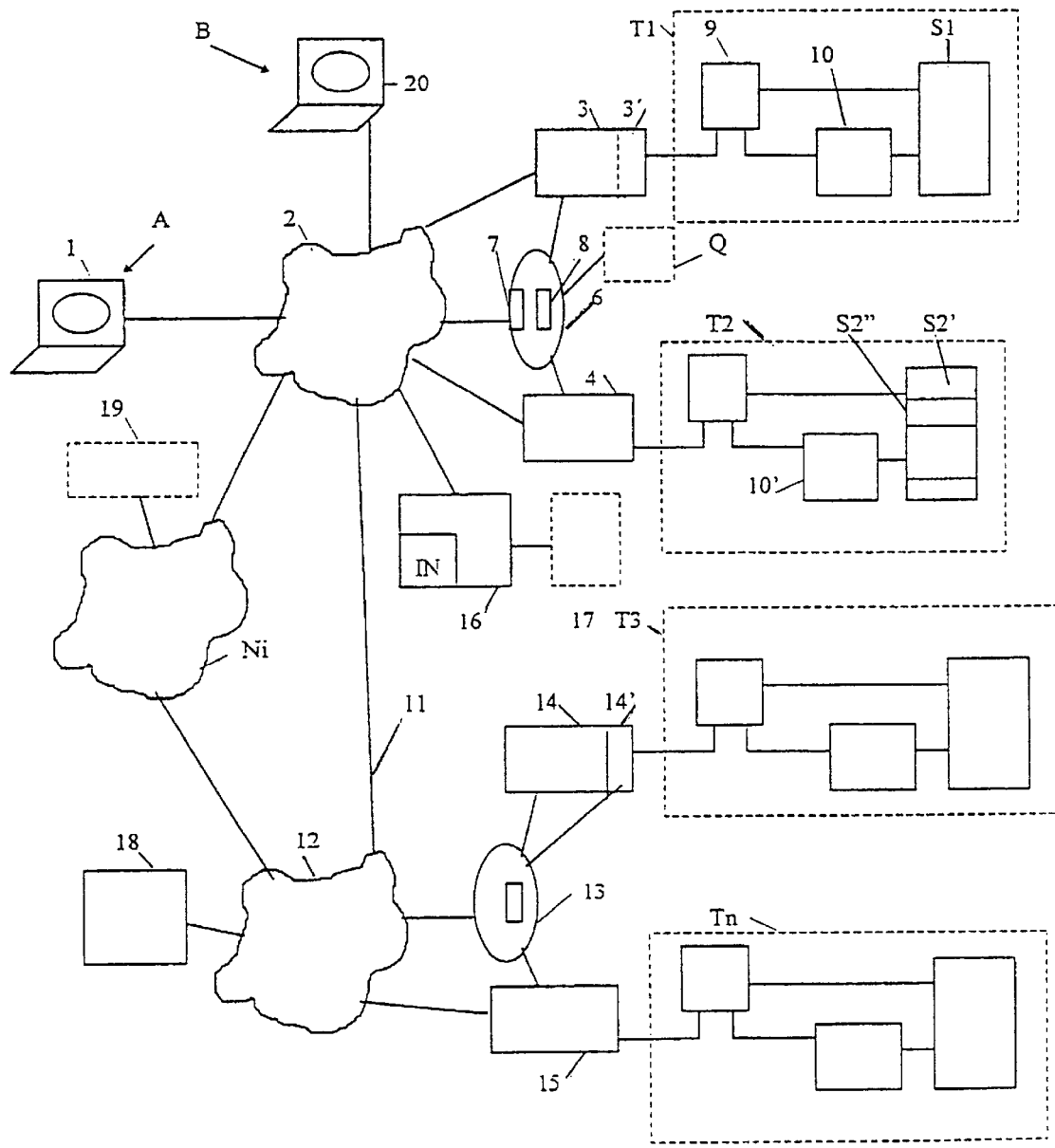
FIG. 1 shows schematically a first embodiment of a directory service in a network according to the invention.

Referring to FIG. 1, a computer 1 for a subscriber A, such as a personnel computer (PC) is connected to a sub-network 2, for instance comprised in an internet or an intranet, for instance through a modem (not shown). A number of databases 3, 4 are connected to the sub-network 2. At least one search engine 6 comprising a menu catalogue 7 is also connected to the sub-network 2 and also it comprises a network catalogue 8 of databases in the network preferably catalogued regarding their content feature in order to speed up the search function. The search engine adapted to the invention is specialised for finding catalogue data about subject information regarding persons and/or organisations.

A person A at the computer 1 states that he/she intends to make a database search for a person and/or family, and/or organisation related information, below called subject information. The sub-network 2 connects the computer to the menu catalogue 7 in the search engine 6. First the catalogue 7 sends a menu regarding what kind of data which is already known, such as name/names permanent summer private address(es) (postal and visiting)

Telephone number(s)

facsimile number(s)

Telex number(s) if relevant

E-mail-address(es)

IP-address(es), like Internet-address(es) etc.

The person A may fill in the known features directly, for instance via the keypad of the computer.

Then, the search engine 6 sends a menu to the computer 1 regarding probable subject information to be searched, which could have the same subjects as in the first menu with the addition of:

Automatic connection to a inquired person/family/company (This could be done for instance by marking the E-mail-address or telephone number in a particular way, for instance setting ** in front of the address or number and then an automatic request/search-person- or- organisation will be established.)

The person at the computer 1 has the possibility to mark several or all the possibilities in the menu. The search engine makes a translation of data from the PC 1 to data understandable for the sub-network 2. Then, the search engine 6 goes through the network catalogue 8 to find the appropriate databases connected to the network either locally connected to the sub-network 2 or in other sub-networks 12, Ni connected to it in the internet way. It is to be noted that the person making the search could chose to make a basic search first and then make a more extensive search afterwards when he has been provided with basic data to be used in order to make the second search more specific and to save searching time in that way. The search through the network catalogue/catalogues then takes place and could for instance begin with the databases 3, 4 and 16.

The database 3 could for instance be installed in the sub-network by a first telephone company T1. This company is anxious to have the information in the database 3 completely correct all the time. Information in a database could be changed without authorisation from inside the network, for instance by a person himself regarding his own antecedents or by some hacker.

Therefore, the telephone company comprises an internal database 10 of its own connected to the database 3 to make installations of new data or correct old data in the database 3. Also connected to the database 3 is, in a first embodiment, a monitor 9 reacting as soon as there is a change in the database 3 and comparing the changed information to the information in the internal database 10 and sending an alarm to the staff Si in the station to check why there has been a discrepancy. It is to be noted that it is changes in the database 3 inside the network that causes an alarm. Amendments in the external database 10 are written into the database 3 when they are written into the database 10 by the admitted staff at the earliest convenient in order to keep the database 3 updated with the latest information about subjects written into the database 10.

The information in the internal database 10 is prohibited from being changed by any other than the internal staff S1 by suitable means already known in the art. All information to the database 3 is only to be sent from the external reliable database 10 into the network and never the other way around.

The check could be made by means of a phone call to the person which subject data have been changed or by making an extra check of the relevancy of the codes used by the person making the changes. The monitor 9 is thus preferably connected to the database 3 in the network all the time but can alternatively be connected to the database 3 intermittently, i.e. at small, repeated intervals. It is shown to be connected directly to the database 3 but could instead be connected to it via the network 2.

The database 3 could also comprise an extra database portion 3' in which customers could add data regarding themselves and/or write corrected data or temporary data regarding telephone number or the like. This database 3' is not intended to be monitored by the monitor 9 but could be used as means for making updating more often (for instance every week) than once a year when telephone books are normally updated. It could be possible to let a customer for instance place a certain mark at the data regarding him, even if he are not allowed to make any other amendments in the electronic phone book as represented by the database 3. The presence of such a mark instructs the search motor to search in the database portion 3'. It is to be noted that the database 10 could contain many incorrect numbers and addresses at the end of a term without updating of the telephone book.

Such errors could then be corrected by a customer without destroying the reliability of the content in the database 3. The presence of a mark could also be used to alarm the admitted staff that the information in the reliable outside database 10 need be changed in some way and that it could be useful to contact the customer personally to ask if the admitted staff should make some changes regarding this person, company etc.

Nowadays, there are a number of telephone companies working parallel with each other and having their own telecommunication network system, each having its particular telephone number system. This is indicated in FIG. 1 by the database 4 being installed by the telephone company T2 keeping its databases updated and monitored in practically the same way as described for the database 3. However, this telephone company could have several staffs S2', S2" etc. permitted to make changes in the database 10' in different sections of the database.

Depending on the feature to be searched at least one or all the databases 3, 4, and others are searched. If for instance a phone number to a person is searched then the search engine searches the databases by turn until the person and his/her phone number is found. If instead a phone number is given then the search monitor could directly start searching in the database having the particular kind of phone number given, for instance a phone number beginning with 070 or the like.

The search engine 6 could be provided with a feature to monitor the network for finding new databases having subject information and to add these databases as they are found. This could be done automatically, but preferably under supervision of a supervisor Q who can inspect the bases before they are added to the search catalogue 8 in the search engine 6. Thus, the search engine 6 could comprise a momentary catalogue which could be a part of the catalogue 8 for storing information of databases of possible interest until they are approved. It is important to have a safe catalogue in order to make searches for subject information according to the invention reliable and free from intervening disturbances. Therefore, the supervisor Q could inspect the catalogue 8 and the inserted databases at prescribed intervals.

The search engine 6 could also be able to make a wider search and then go to another sub-network in an internet, i.e. through the connection 11 to the sub-network 12 which for instance could be provided in another country.

Now, it is no need to go through the menu catalogue in a search engine 13 connected to the sub-network 12 but only to send over the answers already provided in the menu catalogue 7. However, there could be a need to translate the data coming from the search engine 6 to data adapted to the search engine 13 (not shown). The data found at searches in the databases 14 and 15 installed by the companies T3 and T4, respectively, are sent back to the search engine 6 which present it visually in a form readable for the person at the computer 1.

One 14 of the databases could be commercial, i.e. it sells information. In such a case the search motor 13 is requested to give a notation of the interrogator for checking his/her authority. The database 14 thus has a particular catalogue 14' of subscribers. Otherwise, message could be sent back, via the search engine 6, to the person A informing him that he could get information from the database 14 at a prescribed cost and it could ask if he wishes to have this information right away and a bill for it.

The databases 3, 4, 14, 15 are thus installed by companies providing reliable information in the network. Such data could be presented in the first hand to the customer at the computer 1. The information in the databases 3, 4, 15 are also public. This kind of information could then be noted as reliable information, for instance by placing an A in front of it on the computer display. An A could also be provided for information from the database 14.

However, there could also be databases of lower reliability connected to the sub-network 2 (and/or to some other sub-networks 12 or Ni connected in the internet), for instance a database 16 introduced by the person/company 17 for which questions are made. The search engine 6 could also search for information in such databases, provide it on the computer display 1, and mark it as less relevant information, for instance with a B.

A database of this kind could be provided with an intelligent network (IN) having programmable instructions to for instance amend found data to some other data which is more relevant for the moment being, such as giving a telephone number to an actual visiting address instead of the telephone number to a person's home, or a telephone number to a functioning telephone if an ordinary telephone temporarily does not function properly, or the like.

There could also be databases comprising information having more of a gossip nature, for example the database 18 connected to the sub-network 12. The search engine 6 could pose a question on the computer 1 display if the information in such a database is of interest and send it over to the display if the answer is yes and for instance mark it with a P.

The name of the databases providing information to the operator A at the computer 1 could be given in connection to giving the information.

Also, intranet structures, such as 19, could be connected to some sub-network Ni in the internet. Code words and/or screening functions or the like must then be used in-order to prove that a person is allowed to be provided with information in the intranet structure. The search engine could for instance have found that the searched person works in the company having the intranet structure 19. This information could be provided on the computer display 1. If the person at the computer 1 is provided with appropriate code words a search could also be made inside the intranet 19.

As indicated above a person A at the computer 1 could wish to be connected to a person B at another computer 20 directly by just providing any information regarding him/her, such as name, telephone or facsimile number, postal address, company in which he/she works or the like. This feature is now made possible by using the inventive method and device. The search engine 6 then searches for the E-mail-address or other appropriate connection number through the network using the information given and sets up a connection automatically between the computers 1 and 20 through the network. Connections of this kind could also be provided to persons inside a company having its exchange connected as an intranet and connectable to the internet system comprising the interconnected sub-networks 2, 12, Ni etc.

The menus given above could be extended if the desired information is of a particular kind and does not have a whole information to make an ordinary search. Examples are:

1. Search for "all information about Mr Skog on Allegatan in Solna
2. Search for "telephone number to Mr Svensson who's telephone number begins with 1357".
3. Search for "the E-mail-address of the person having the telephone number 123456".

In the first case there could be more cities named Solna each having a street named Allegatan. There could be more than one Mr Skog living on at least one of the streets Allevägen. All the alternatives found by the search are then presented to the person at the computer 1 to choose among and/or to add an extra search information, for instance "working at the company Ericsson".

In the second case "Svensson" is a very common name and the telephone number was given without state and/or city code. Then, if the search engine finds that the search will be too extensive it will ask for more information, for instance about the visiting area.

In the third case the search engine will make a first search using the telephone number to find the person and then a second search to find that persons E-mail-address.

The search in the internet could either be done directly in only one directory database or search engines could be used for setting together information from different databases as described above. All requested known information is to be provided directly to the computer display for the person who is making the search.

Figure 2:
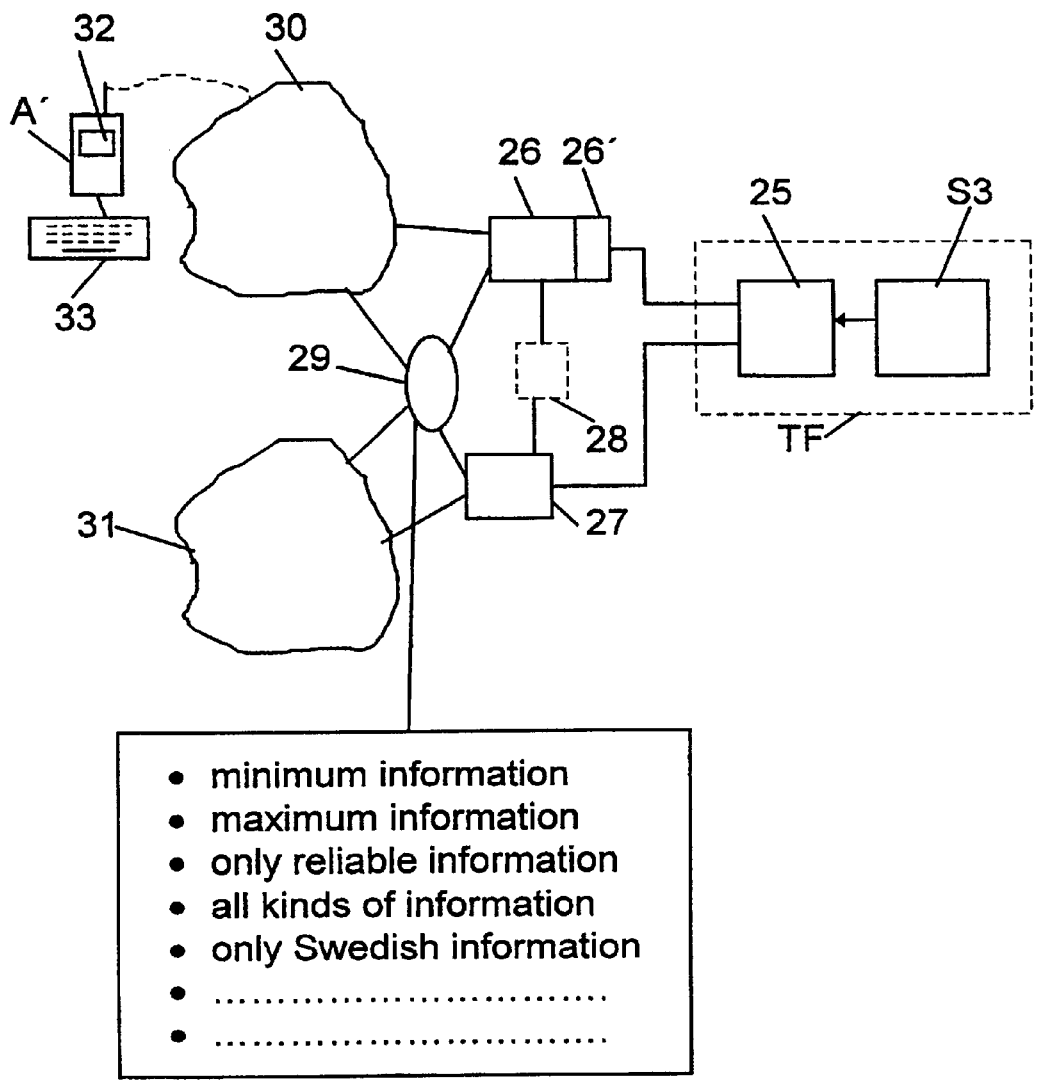
FIG. 2 shows schematically a second embodiment of a directory service in a network according to the invention.

In the part of a network shown in FIG. 2 a telephone company TF or the like having a reliable database 25 in which only admitted staff S3 is permitted to insert new or amend earlier inserted matter. In order to have a redundancy inside the network, such as an intranet or an internet the information in the database 25 is transmitted through different channels to at least two internal databases 26 and 27 inside the network. These internal databases could be positioned in positions spaced apart from each other. If a failure happens in or around the position for one or the databases 26 or 27 there is a great chance that the other is in order. In order to enhance the reliability a monitor 28, for instance in the form of an intelligent network, could from time to time be connected to both these databases and compare their contents with each other and send an alarm to the telephone company when a discrepancy is discovered. As shown in FIG. 2 one of the databases 26 has a portion 26' in which persons/companies etc., subscribers of the telephone company, could complete the information at will regarding them and provided in the database 25 by the telephone company staff S3.

As in FIG. 1, a search engine 29 is connected to the databases 26 and 27 and to a sub-network 30. It could also be connected to a second sub-network 31. Each of the databases 26 and 27 is shown to be connected to an individual of the two sub-networks. It is, however, to be noted that the two databases 26 and 27 can be connected to the same sub-network if this is suitable.

The subscriber A' is in FIG. 2 not represented by a PC but instead of a mobile telephone, which as an example is shown to have a display 32 and a separate keyboard 33. The mobile telephone could for instance be of the GSM kind connected through a GSM network to the sub-network 30.

Another subscriber B' searching for information could be provided different levels of information search and required information at will as presented by the by menu, for instance "search only telephone number" or "search full information about the searched subject" or the like. A search for delimited information could be made both in a reliable database portion with a reliability guarantied by a telephone company or the like, such as 26, and in a database portion, such as 26', having information inserted by any subscriber, and also in some other database with personal information handled by anyone.

Thus the searches in the public network could be made in many ways controlled by the menu provided by the search engine. However, the person B' searching for catalogue data about a searched subject could be provided with reliable data and or with less reliable data at will and the uncertainty of the catalogue data is shown clearly on his screen, or some other medium. Telephone units with talking possibilities, for instance for blind persons, could of course be used in the same way as a telephone with a display or a PC and provide a talking menu and give talking questions instead of showing it.

Although the invention is described with respect to exemplary embodiments it should be understood that modifications can be made without departing from the scope thereof. Accordingly, the invention should not be considered to be limited to the described embodiments, but defined only by the following claims which are intended to embrace all equivalents thereof

What is claimed is:

1. A method for providing reliable and secure directory services for telecommunication, comprising the following steps:

connecting terminal means to a data network;

providing database means in the data network comprising catalogue data regarding subject information about persons/families/companies/organizations, arranged so that catalogue searches using different search criteria can be performed;

providing means for interactive communication between the terminal means and the network regarding the database means;

asking for the desired information and adequate search criteria from the terminal means, performing the search;

presenting desired catalogue data visually on a display of the terminal means asking for the subject information;

providing a reliable database outside the network, said reliable database containing reliable information and only accessible and changeable by admitted operating staff means and not by entities operating from within the network; and transmitting the reliable information from the reliable database to at least a reliable inside portion of the database means inside the network, which portion is to be kept reliable, so that said reliable inside portion contains a duplicate of the reliable information that is accessible to the terminal means asking for the subject information.

2. A method according to claim 1, further comprising providing at least two redundant independent reliable database portions of the database means inside the network, both being provided with the reliable information in the reliable outside database and updated when the reliable information in the reliable outside database is amended.

3. A method according to claim 1, further comprising providing a monitor means between each duplicate reliable portion of the inside database means and the outside reliable database to supervise that the reliable portion of the inside database means has the same reliable information as the outside reliable database.

4. A method according to claim 1, further comprising providing an additional inside database portion not being supervised adapted for customers to add data regarding their own subject information present in the reliable database to be supervised.

5. A method according to claim 1, further comprising providing at least one of the inside database portions with an intelligent network providing alternative information if available and/or demanded.

6. A method according to claim 1, wherein the data network is of a public kind, being readable by anyone connected to the public data network.

7. A method according to claim 6, wherein the database means in the data network comprise at least two internal databases which both do not necessarily have to be fully reliable, and search engine means are inserted in the data network to make the search for the desired information among the database portions.

8. A method according to claim 7, further comprising providing question menu means in the search engine means, said menu means to be provided to the terminal means when activating a search for subject information by answering a question of the kind of desired subject information and knowledge about data usable for database search for finding if the desired subject information is derivable.

9. A method according to claim 1, further comprising providing information on the reliability qualities of the information(s) derived from the searched databases to the terminal means asking for the subject information, so that a mixing of fully reliable data and doubted data can be mixed in the same search.

10. A method according to claim 1, further comprising providing a connection to a terminal connected to the data network belonging to the person/organization about which the subject information was searched, if asked for by the connecting terminal means.

11. A device for providing reliable and secure directory services for telecommunication, comprising:

a data network, terminal means connected to the data network, database means provided in the data network, means for interactive communication between the terminal means and the network regarding the database means, catalogue data in the database means regarding subject information about persons families/companies, arranged so that catalogue searches using different search criteria can be done, means for asking for the desired information and adequate search criteria from the terminal means, means for performing the search, and means for presenting desired catalogue data visually on a display of the terminal, means asking for the subject information, a reliable database outside the network, said reliable database containing reliable information and only accessible and changeable by admitted operating staff means, and not by entities operating from within the network and means for transmitting the reliable information from the reliable database to at least a reliable part of the database means inside the network, which part is to be kept reliable, so that said reliable inside portion contains a duplicate of the reliable information that is accessible to the terminal means asking for the subject information.

12. A device according to claim 11, further comprising at least two redundant independent reliable database portions of the database means inside the network, both being provided with the reliable information in the reliable outside database and updated when the reliable information in the reliable outside database is amended.

13. A device according to claim 11, wherein the data network is of a public kind, being readable by anyone connected to the public data network.

14. A method according to claim 13, wherein the database means in the data network comprises at least two internal databases which both do not necessarily have to be fully reliable, and search engine means are inserted in the data network to make the search for the desired information among the database portions.

15. A device according to claim 11, further comprising monitor means between each duplicate reliable portion of the inside database means and the outside reliable database to supervise that the reliable portion of the inside database means has the same reliable information as the outside reliable database.

16. A device according to claim 11, further comprising an additional part not being supervised for customers to add data regarding their own subject information present in the inside reliable database portion to be supervised.

17. A device according to claim 11, further comprising means for providing information on the reliability qualities of the information derived from the searched databases to the terminal means asking for the subject information, so that a mixing of fully secure data and doubtable data can be mixed in the same search.

18. A device according to claim 11, further comprising an intelligent network in at least one of the database portions providing alternative programmed information if available and/or demanded.

19. A device according to claim 11, further comprising means for providing a connection to a terminal connected to the data network belonging to the person/organization about which the subject information was searched, if asked for by the connecting terminal means.

20. A device according to claim 11, further comprising several reliable databases outside the network only accessible and changeable by admitted staff means transmitting information to at least one inside reliable database each in the network.

* * * * *